I. B. Lathrop.
Upsetting Tires.
Nº 34,305. Patented Feb. 4, 1862.
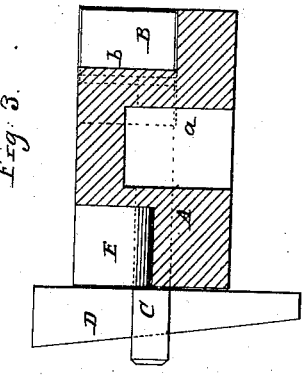
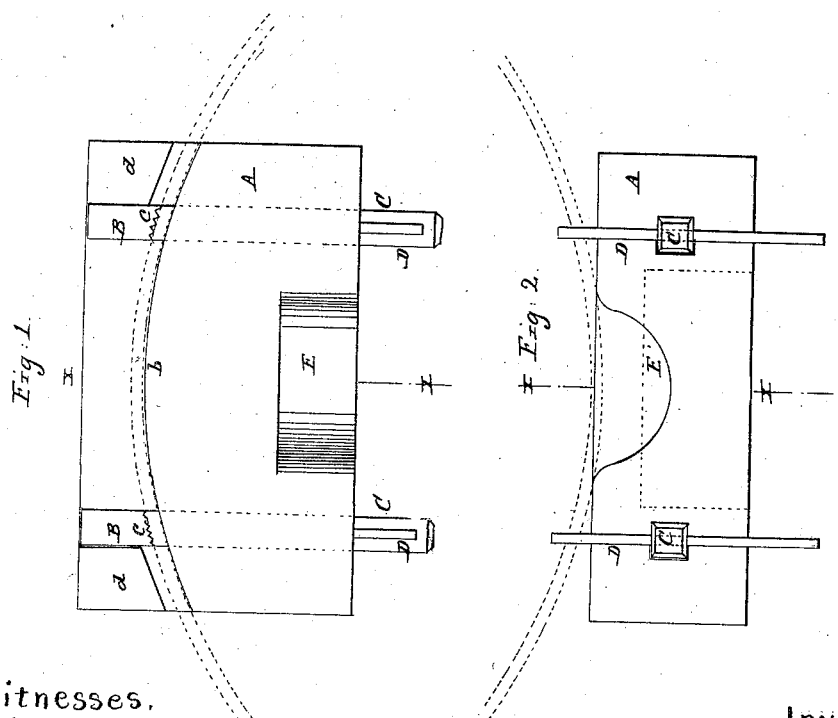
Witnesses.
J W Coombs
G W Reed
Inventor:
I. B. Lathrop
per Munn & Co
attorneys

UNITED STATES PATENT OFFICE.

L. B. LATHROP, OF SAN JOSÉ, CALIFORNIA.

IMPROVEMENT IN APPARATUS FOR SHRINKING TIRES.

Specification forming part of Letters Patent No. 34,305, dated February 4, 1862.

*To all whom it may concern:*

Be it known that I, L. B. LATHROP, of San José, in the county of Santa Clara and State of California, have invented a new and Improved Implement or Device for Shrinking Tires; and I do hereby declare that the following is a full, clear, and exact description of the same, reference being had to the annexed drawings, making a part of this specification, in which—

Figure 1 is a plan or top view of my invention. Fig. 2 is an end view of the same. Fig. 3 is a transverse vertical section of same, taken in the line $x\ x$, Fig. 2.

Similar letters of reference indicate corresponding parts in the several figures.

This invention relates to a simple and efficient implement or device for contracting or shrinking the tires of wheels for vehicles without cutting or welding them.

The object of the invention is to effect the result without the employment of levers and complex arrangements for compressing the heated part of the tire as hitherto practiced.

The invention consists in the employment or use of an anvil or metal block provided with clamps and a curved or rounded face-piece and a concave or recess, as hereinafter described.

To enable those skilled in the art to fully understand and construct my invention, I will proceed to describe it.

A represents a cast-iron block of square or rectangular form, and provided with a recess or mortise $a$ in its under side to admit of being fitted on a suitable block or support similar to an ordinary anvil. The block A has a vertical curved shoulder $b$ near one end of it, said shoulder extending the whole width of the block and forming a convex face-piece, the curvature of which should correspond as nearly as possible with the curvature of the tire.

B B represent the jaws or clamps, the faces of which are serrated, as shown at $c$. The jaws or clamps have each a tang or shank C attached, and these tangs or shanks pass through holes in the block A. Each tang or shank C has a hole made through it to receive a key or wedge D. The jaws or clamps B B bear at their outer sides against projections $d$, which serve as guides.

E is a concave or recess in the upper surface of the block A at the end opposite to that near the convex or curved face-piece $b$. The recess E is semicircular in form, as shown clearly in Fig. 2.

The implement is used as follows: The tire to be shrunk is heated at the proper or desired part, and said heated part is placed on the block A directly over the recess E, the tire being in an upright position. (See Fig. 2.) The operator then places a set hammer on the heated part of the tire and strikes said hammer with a sledge, so that a short bend will be formed in the tire. The tire is then placed in a horizontal position, the bent heated part being between the jaws or clamps B B and the latter being forced against the tire at each side of the heated part by driving down the keys or wedges D D. The operator then, by means of a proper sledge or hammer, flattens or "upsets" the short bend against the face-piece $b$, and the work is done.

It will be understood that the short bend in the tire given it over the recess E contracts it, while the securing of the heated part of the tire between the jaws or clamps B B and the hammering or upsetting of the bend against the face-piece $b$ reduces said part to its proper form or shape. Thus it will be seen that the levers and various complex arrangements hitherto used for shrinking tire without cutting and welding are avoided and a very simple implement obtained for the purpose.

I do not claim, broadly, the invention or use of wedges and movable jaws to assist in clamping the tire; but,

Having thus described my invention, what I claim as new, and desire to secure by Letters Patent, is—

A tire-shrinking device composed of a block A, provided with a concave E, curved shoulder $b$, guides $d\ d$, movable jaws B B, and wedges D D, all combined and operating as herein shown and described, for the purpose set forth.

L. B. LATHROP

Witnesses:
- E. M. CHAPMAN,
- HUGH HARE.